(12) United States Patent
Wu et al.

(10) Patent No.: US 11,991,197 B2
(45) Date of Patent: May 21, 2024

(54) DEEP LEARNING USING ACTIVITY GRAPH TO DETECT ABUSIVE USER ACTIVITY IN ONLINE NETWORKS

(71) Applicant: Microsoft Technology Licensing, LLC, Redmond, WA (US)

(72) Inventors: Yi Wu, San Jose, CA (US); Mariem Boujelbene, Louisville, KY (US); James R. Verbus, San Mateo, CA (US); Jason Paul Chang, San Mateo, CA (US); Beibei Wang, Santa Clara, CA (US); Ting Chen, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 17/705,146

(22) Filed: Mar. 25, 2022

(65) Prior Publication Data
US 2023/0164157 A1 May 25, 2023

Related U.S. Application Data

(63) Continuation-in-part of application No. 17/534,148, filed on Nov. 23, 2021.

(51) Int. Cl.
  *H04L 9/40* (2022.01)
  *G06F 18/2431* (2023.01)
  *G06N 3/04* (2023.01)

(52) U.S. Cl.
  CPC ...... *H04L 63/1425* (2013.01); *G06F 18/2431* (2023.01); *G06N 3/04* (2013.01)

(58) Field of Classification Search
  None
  See application file for complete search history.

(56) References Cited

U.S. PATENT DOCUMENTS

| | | | |
|---|---|---|---|
| 902,654 A | 11/1908 | Hannas | |
| 8,966,036 B1* | 2/2015 | Asgekar | H04W 4/08 707/706 |
| 9,729,571 B1* | 8/2017 | Ferguson | H04L 63/1408 |
| 11,418,485 B2 | 8/2022 | Liu | |
| 11,586,685 B2 | 2/2023 | Feijoo | |
| 2016/0210181 A1* | 7/2016 | Kikuchi | G06F 11/3419 |
| 2016/0248644 A1* | 8/2016 | Dontcheva | G06T 11/206 |
| 2016/0337399 A1* | 11/2016 | Kamath | H04L 63/0428 |

(Continued)

OTHER PUBLICATIONS

Luo, et al., "BotGraph: Web Bot Detection Based on Sitemap", In Repository of arXiv:1903.08074v1, Mar. 19, 2019, 7 Pages.

(Continued)

*Primary Examiner* — Chris Parry
*Assistant Examiner* — Abderrahmen Chouat
(74) *Attorney, Agent, or Firm* — Schwegman, Lundberg & Woessner, P.A.

(57) ABSTRACT

In an example embodiment, a deep learning algorithm is introduced that operates on a transition matrix formed from user activities in an online network. The transition matrix records the frequencies that particular transitions between paths of user activity have occurred (e.g., the user performed a login activity, which has one path in the network, and then performed a profile view action, which has another path in the network). Each transition matrix corresponds to a different user's activities.

20 Claims, 11 Drawing Sheets

(56) References Cited

U.S. PATENT DOCUMENTS

| | | |
|---|---|---|
| 2017/0046787 A1 | 2/2017 | Bothwell |
| 2018/0351981 A1 | 12/2018 | Muddu |
| 2020/0274894 A1* | 8/2020 | Argoeti ............... H04L 63/1433 |
| 2021/0067533 A1* | 3/2021 | Zhou ................ G06F 16/90344 |
| 2021/0264233 A1 | 8/2021 | Gronát |
| 2021/0273973 A1 | 9/2021 | Boyer |
| 2022/0286472 A1* | 9/2022 | Khalil ................. H04L 63/0876 |
| 2022/0303288 A1 | 9/2022 | Wang |
| 2023/0007024 A1 | 1/2023 | Maria Vega |
| 2023/0012220 A1 | 1/2023 | Humphrey |
| 2023/0079370 A1* | 3/2023 | Doyle ................. G06F 16/2379 |
| | | 707/703 |
| 2023/0083949 A1 | 3/2023 | Mutolo |

OTHER PUBLICATIONS

Noorshams, et al., "TIES: Temporal Interaction Embeddings For Enhancing Social Media Integrity At Facebook", In Repository of arXiv:2002.07917v1, Feb. 18, 2020, 9 Pages.

Zhao, et al., "BotGraph: Large Scale Spamming Botnet Detection", In Proceedings of 6th USENIX Symposium on Networked Systems Design and Implementation, Apr. 22, 2009, pp. 321-334.

Notice of Allowance mailed on Dec. 4, 2023, in U.S. Appl. No. 17/534,148, 28 pages.

* cited by examiner

DEEP LEARNING USING ACTIVITY GRAPH TO DETECT ABUSIVE USER ACTIVITY IN ONLINE NETWORKS

RELATED APPLICATIONS

This application is a continuation-in-part of, and claiming the benefit of priority to, U.S. patent application Ser. No. 17/534,148, filed on Nov. 23, 2021, hereby incorporated by reference in its entirety.

TECHNICAL FIELD

The present disclosure generally relates to technical problems encountered in machine learning. More specifically, the present disclosure relates to the use of deep learning with an activity graph to detect abusive user activity in an online network.

BACKGROUND

The rise of the Internet has occasioned two disparate yet related phenomena: the increase in the presence of online networks, such as social networking services, with their corresponding user profiles visible to large numbers of people, and the increase in abusive activities taken by unscrupulous actors using the online network. Various types of abusive activities have become commonplace, such as the creation of fake accounts, hacking of legitimate accounts to post content or perform other account activities without the account holder's consent, unauthorized data scraping (where online content, such as user profiles, are scanned by automated bots and the content taken for use outside the online network), and automated spam.

What is needed is a solution that can reduce or eliminate such abusive activities in an online network.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
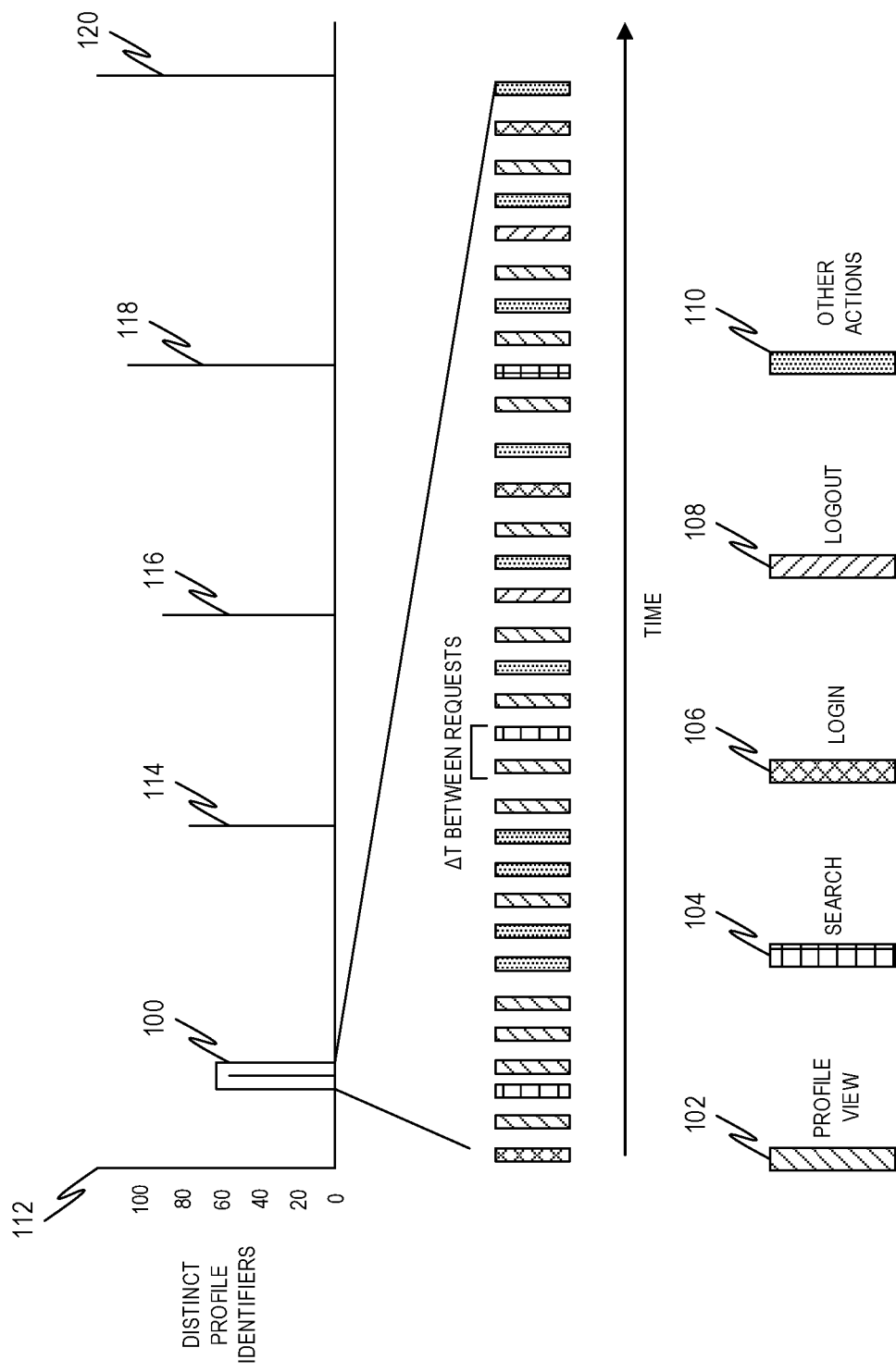
FIG. 1 is a diagram illustrating a visualization of profile scraping activity by a logged-in member, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

One approach to reducing and/or eliminating abusive activities in an online network is to train and utilize a machine-learned model using a machine learning algorithm. The machine-learned model can be trained to identify abusive activities and either alert an administrator who can take steps to stop the abusive activities (e.g., suspending access) or automatically take such steps.

There are technical problems encountered, however, when applying machine learning to abusive activity detection in an online network. In many online networks there are multiple heterogeneous site surfaces that need to be defended. In other words, there are many different interfaces and/or portions of interfaces that an attacker may use to launch an attack. Each of these site surfaces would need to have its own separately trained machine-learned model. Further, traditional machine-learned models use hand-engineered features that are specific to particular types of abusive behavior and site surface. Additionally, traditional features engineered by humans may not fully leverage the available signals in rich member activity patterns. Lastly, since many of the abusive attacks are initiated with adversarial intent, such attackers are often quick to adapt and evolve to evade anti-abuse defenses.

One solution would be to introduce a deep learning machine-learned sequential model that operates directly on a raw sequence of user activity in an online network. This allows the system to scalably leverage more of the available signals hidden in the data and stop adversarial attacks more efficiently than other machine-learned models. This, however, leads to other technical issues. Particularly, the sequences used as input to such a deep learning machine-learned model would be limited to a short length for two reasons. Firstly, in order for a deep learning machine-learned model to work, the inputs would need to be same length. In other words, each sequence used as input would need to be some constant length, which is computationally burdensome. Additionally, since the input data is processed sequentially, the machine-learned model suffers from information loss, especially in the earlier sequence and a decrease in the ability to correlated different pieces of subsequences, which is important in detecting certain scraping behaviors.

As such, in an example embodiment, user activities are aggregated into a transition matrix. The transition matrix records the frequencies (number of times per period) that particular transitions between paths of user activity have occurred (e.g., the user performed a login activity, which has one path in the network, and then performed a profile view action, which has another path in the network). More particularly, each unique path in the sequence may be termed a "node". This unique path may reoccur many times in the sequence. The transition matrix thus records the frequencies between these nodes. Each transition matrix corresponds to a different user's activities. In an example embodiment, the frequency is measured by counting the number of transitions between each pair of paths performed by the user in a given time period (e.g., one day). Furthermore, the size of the transition matrix may be limited by measuring only transitions to or from the X selected standardized paths from the user's activity. In an example embodiment, X may be set at 500. A standardized path is a path that has been normalized to a standard format.

As a user visits an online network, such as a social networking service, the user's web browser or application makes many requests to the servers of the online network. Each request includes a path identifying the part of the online network the user's browser or application intends to access. In order to directly and scalably leverage the rich signals from member activity patterns, in an example embodiment, a standardized dataset is created, capturing the sequence of user requests to an online network.

More particularly, each specific request path is translated into a standardized token that indicates the type of the request (e.g., profile view, search, login, etc.). This eliminates the need for human curation of features. Then, the standardized request paths are standardized to integers based on the frequency of that request path across all users. This allows information about how common a given type of request is to be provided to the machine-learned model.

The activity sequences, including standardized tokens, may then be translated into an activity transition matrix for each user, and this activity transition matrix may then be fed to a deep convolutional neural network that takes the matrix as a two-dimensional (2D) array (like an image) and classifies it as abusive or not.

In another example embodiment, more information may be put in the matrix and the matrix becomes a three-dimensional (3D) array. The deep convolutional neural network then takes this 3D array and classifies it as abusive or not.

The result is a deep learning machine-learned model that is able to detect additional abusive accounts with higher precision than other machine-learned models and with higher accuracy. It can also detect more sophisticated abusive behavior, such as slow abusive behavior, where a user sends requests with large time intervals between them.

Description

The disclosed embodiments provide a method, apparatus, and system for training and using a deep learning machine-learned model that operates directly on a raw sequence of user activity in an online network, in order to detect abusive activities. This allows the system to scalably leverage more of the available signal hidden in the data and stop adversarial attacks more efficiently than other machine-learned models.

The term "abusive" in this context means that the user account that is associated with the activities is engaging in operations that are prohibited by the online network. This may include, but is not limited to, scraping data without permission, creation of fake accounts, account takeovers, and automated spam. Not all of these activities are always "bad." Scraping, for example, is expressly authorized for search engines in order to collect and index information throughout the Internet. What makes scraping abusive is when it is performed without permission. Unauthorized scraping refers to the automated collection of data from the online network without the permission of the online network or its users. One strategy that unauthorized scrapers use to collect data is to automate the behavior of accounts logged into the online network. Logged-in scraping can be performed by real accounts (e.g., users using browser extensions to automate their behavior, or accounts that have been taken-over/hacked) or fake accounts (accounts that do not correspond to a real person, which are created by bad actors to scale their ability to scrape data).

It should be noted that while specific embodiments are described herein in the context of scraping, the same deep learning model may be used to detect other types of abusive operations, and nothing in this document shall be interpreted as limiting scope of protection to scraping detection, unless expressly recited.

As a user visits an online network, such as a social networking service, the user's web browser or application makes many requests to the servers of the online network. Each request includes a path identifying the part of the online network the user's browser or application intends to access. FIG. 1 is a diagram illustrating a visualization of profile scraping activity by a logged-in member, in accordance with an example embodiment. Here, a sequence 100 is visualized as a series of discrete operations, each classified under a different "type" of operation. For example, some of the operations are profile view operations 102, some of the operations are search operations 104, some of the operations are login operations 106, some of the operations are logout operations 108, and the remainder are classified as "other user actions" 110. Graph 112 depicts how each sequence, such as sequence 100, sequence 114, sequence 116, sequence 118, and sequence 120 may be performed at different times or in different sessions. Each sequence represents a series of requests. The sequences may be divided from each other based on either time or session. For example, the system may divide sequences by day, such that each sequence is a different day's requests from a particular user. Alternatively, the system may divide sequences by session, such that each sequence is a different session's requests from the particular user. The y-axis of the graph 112 represents the distinct profile views—each unique profile viewed is assigned a new identifier. The x-axis is time. This particular user viewed five bursts of approximately 20 profiles each, while occasionally revisiting the same profiles they had viewed previously.

In an example embodiment, an automated process may be used to translate the specific path in each request a user makes into a standardized model vocabulary. Specifically, each specific request path is translated into a standardized token that indicates the type of the request (e.g., profile view, search, login, etc.). Each token is an alphanumeric sequence that uniquely corresponds to the type of the request. For example, "profile view" may represent a profile view, or alternatively "1×3F" may represent a profile view. Thus, if the path "linkedin.com/jamesverbus/" corresponds to a profile view, then this path is translated to "profile view." This is performed in an automated manner that does not require human curation. The result is an encoded activity sequence, where each request path has been replaced by a standardized token representing the activity type.

Notably, the request paths in the sequence of request paths are still kept in the same order when they are encoded. In other words, if a particular request path came first in the sequence, then when that request path is standardized, the resultant token will also come first in the encoded version of the sequence. The same is true for all the other request paths in the sequence. Thus, the encoded activity sequence includes the encoded request paths and the order of those encoded request paths.

Then the standardized request paths are mapped to integers based on a ranking of the frequency of that request path across all users. For example, if the profile view was the third most frequently standardized request graph among all users during the time period, then the "profile view" standardized request path would be mapped to the integer "3." This allows information about how common a given type of request is to be provided to the machine-learned model. The integer array is the activity sequence.

Figure 2:
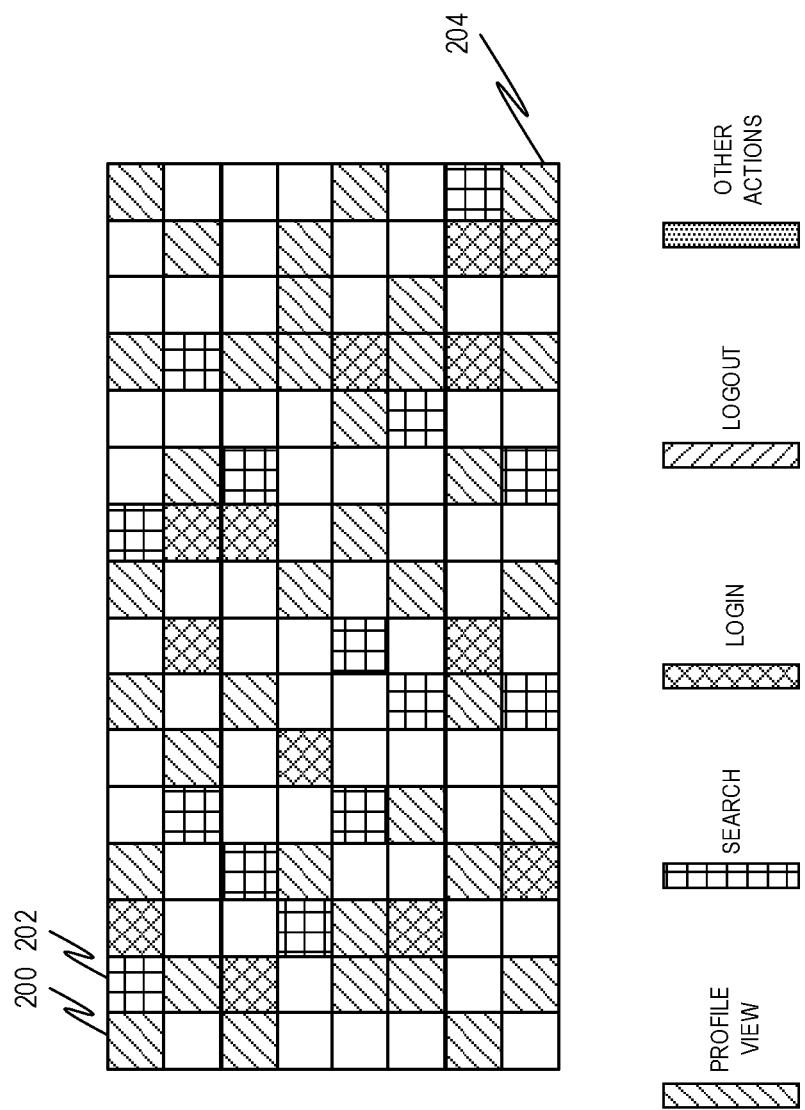
FIG. 2 is a diagram illustrating a visualization of a resulting encoded activity sequence of a first user, in accordance with an example embodiment.

FIG. 2 is a diagram illustrating a visualization of a resulting encoded activity sequence of a first user, in accordance with an example embodiment. Here, each activity operation is represented as a box, such as box 200 or box 202. These boxes are patterned in a way that common paths use the same pattern, and the uncommon paths use a different pattern (with different patterns for different levels of commonality in the paths). The visualization may be read left to right, top to bottom, with the first request being at box 200, and the last at box 204. Here, the first user is not using abusing automation, as evidenced by the fact that the operations are more heterogeneous.

Figure 3:
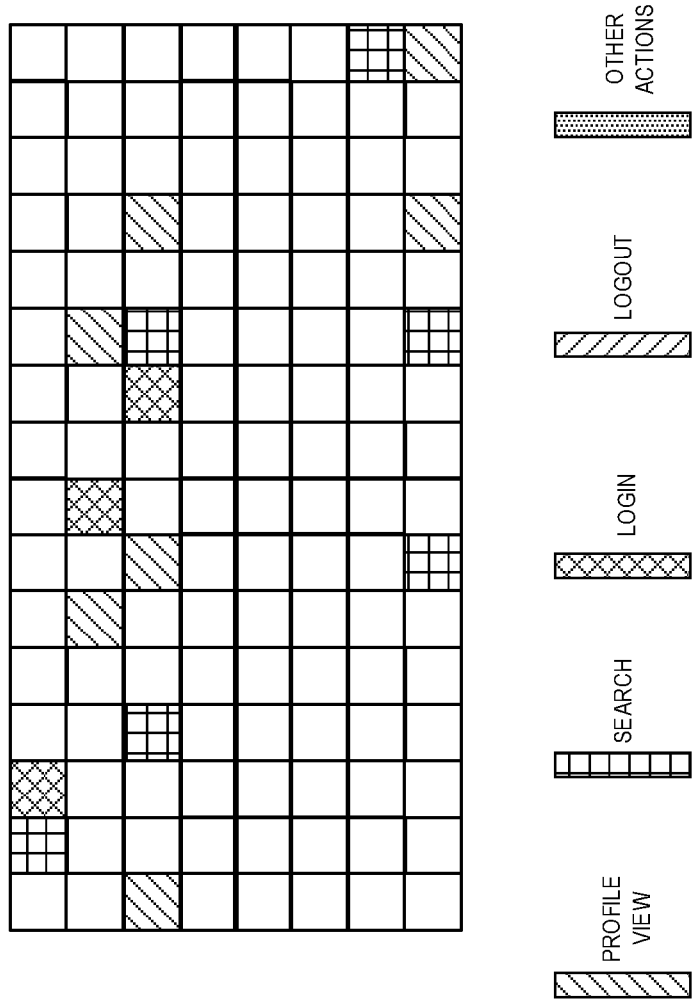
FIG. 3 is a diagram illustrating a visualization of a resulting encoded activity sequence of a second user, in accordance with an example embodiment.

FIG. 3 is a diagram illustrating a visualization of a resulting encoded activity sequence of a second user, in accordance with an example embodiment. Here, the user is using abusive automation, as evidenced by the fact that the operations are more homogenous. It is difficult for bad actors using automation to simulate the subtle patterns of requests created by normal, healthy, organic user behavior in an online network. Of course, these patterns and their classification are determined by the deep learning algorithm, and not by a human viewer, and FIGS. 2 and 3 are merely visualizations for the reader of this document to help illustrate the differences in the patterns.

Figure 4:
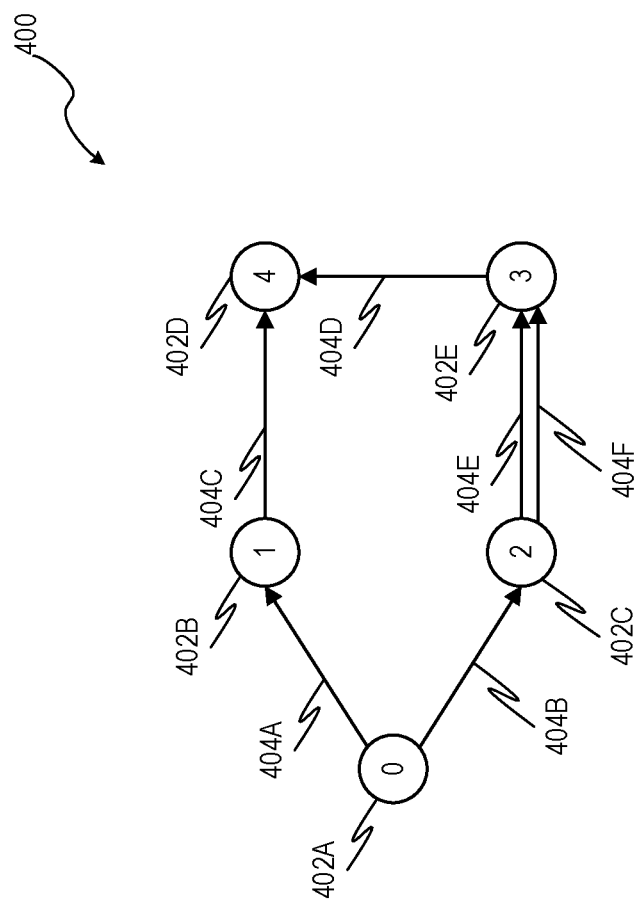
FIG. 4 is a diagram illustrating a visualization of a graph of activity sequences for a user, in accordance with an example embodiment.

The sequences may then be formed into graphs, with each graph representing activity sequences for a particular user. FIG. 4 is a diagram illustrating a visualization of a graph 400 of activity sequences for a user, in accordance with an example embodiment. For simplicity, only five normalized paths in the activity sequences are depicted here, but as described above in an example embodiment the top X (e.g., 500) paths, may be captured by the graph (and the subsequent activity transition matrix, depicted in FIG. 5 later).

Here, each path captured is depicted as a separate node 402A-402E. Directed connections 404A-404F between the nodes 402A-402E are also depicted. Each directed connection 404A-404F represents a separate transition that occurred in that particular user's activity sequences for a particular time frame (e.g., over the last day). As can be seen, for example, here the corresponding user visited path 0 and then path 1 (directed connection 404A), and also visited path 0 and then path 2 (directed connection 404B). The user also visited path 3 twice from path 2, hence directed connections 404E and 404F.

Figure 5:
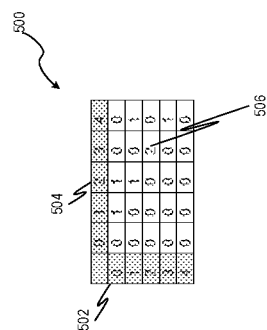
FIG. 5 is a diagram illustrating an activity transition matrix, in accordance with an example embodiment.

FIG. 5 is a diagram illustrating an activity transition matrix 500 in accordance with an example embodiment. Here, the graph 400 of FIG. 4 is turned into the activity transition matrix 500. The activity transition matrix 500 has a first axis 502 representing the source normalized path and a second axis 504 representing the destination normalized path. The cells of the activity transition matrix 500 contain values indicative of the number of times the user transitioned from the corresponding source normalized path to the corresponding destination normalized path, during the particular time period. Here, for example, cell 506 indicates that the user transitioned from normalized path 2 to normalized path 3 twice during the particular time period, which matches the two directed connections 404E and 404F from FIG. 4.

As mentioned earlier, the deep learning algorithm may then use the activity transition matrices to classify the corresponding sequences of user requests as abusive or not abusive.

Figure 6:
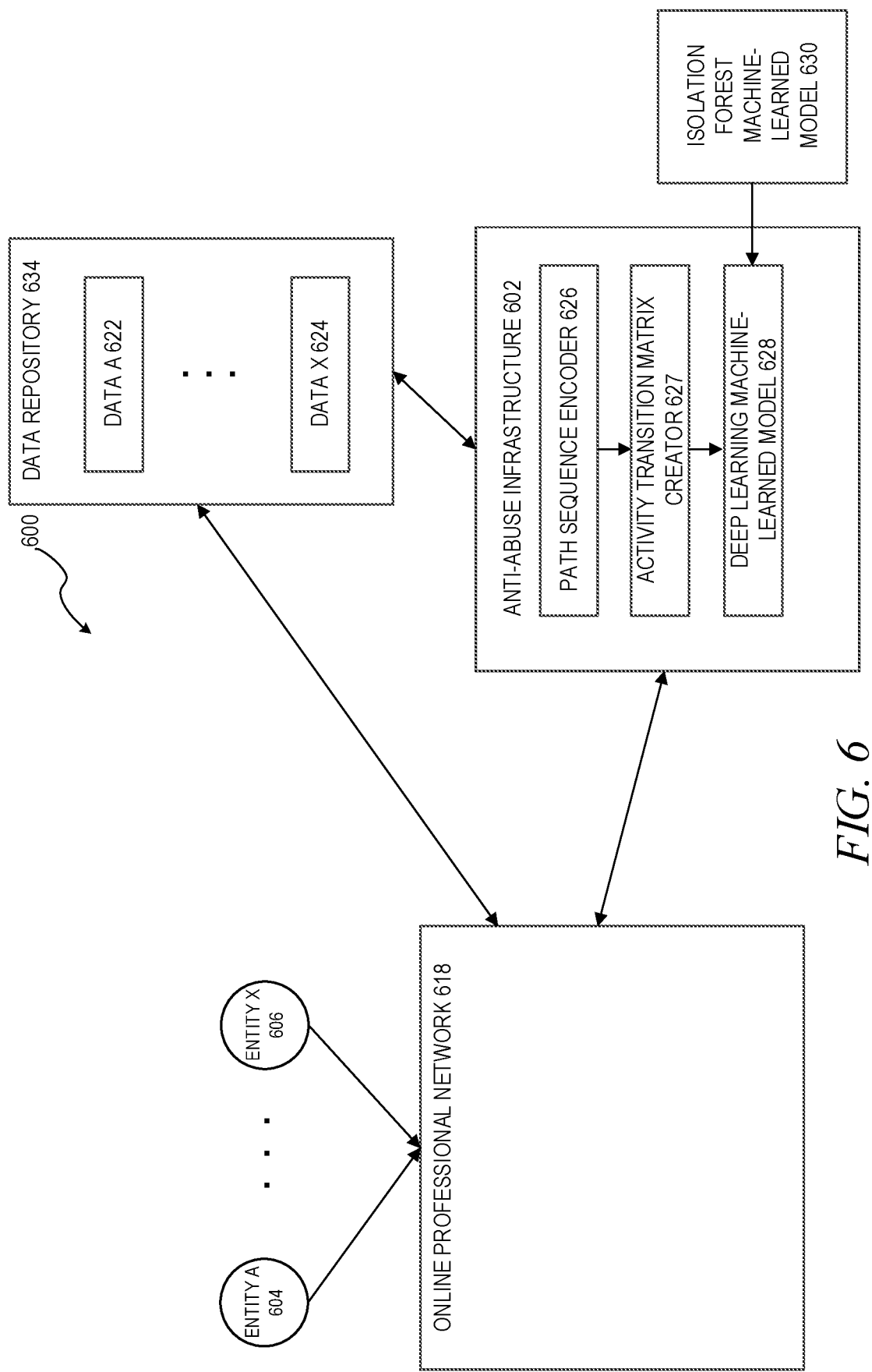
FIG. 6 is a block diagram illustrating a system for detecting abusive operations in an online network, in accordance with an example embodiment.

The disclosed embodiments provide a method, apparatus, and system for managing malicious user activity with a service. FIG. 6 is a block diagram illustrating a system 600 for detecting abusive operations in an online network, in accordance with an example embodiment. The detection components may be implemented as a service that may be provided by or associated with an online professional network 618 or other community of users, which is used by a set of entities (e.g., entity A 604, entity X 606) to interact with one another in a professional, business, and/or social context.

The entities may include users that use online professional network 618 to establish and maintain professional connections, list work and community experience, endorse and/or recommend one another, search and apply for jobs, and/or perform other actions. The entities may also include companies, employers, and/or recruiters that use the online professional network 618 to list jobs, search for potential candidates, provide business-related updates to users, advertise, and/or take other action. The entities may further include guests that are not registered users of the online professional network 618 and thus have restricted access to the online professional network.

Entities that are registered users of online professional network 618 may use a profile module 626 in the online professional network 618 to create and edit profiles containing information related to the entities' professional and/or industry backgrounds, experiences, summaries, projects, skills, and so on. The profile module 626 may also allow the entities to view the profiles of other entities in the online professional network 618.

Entities that are registered users and guests may use a search module 628 to search the online professional network 618 for people, companies, jobs, and/or other job- or business-related information. For example, the entities may input one or more keywords into a search bar to find profiles, job postings, articles, advertisements, and/or other information that includes and/or otherwise matches the keyword(s). The entities may additionally use an "Advanced Search" feature of the online professional network 618 to search for profiles, jobs, and/or other information by categories such as first name, last name, title, company, school, location, interests, relationship, industry, groups, salary, experience level, and so forth.

Entities that are registered users of the online professional network 618 may also use an interaction module 630 to interact with other entities in the online professional network 618. For example, the interaction module 630 may allow an entity to add other entities as connections, follow other entities, send and receive messages with other entities, join groups, and/or interact with (e.g., create, share, re-share, like, and/or comment on) posts from other entities. The interaction module 630 may also allow the entity to upload and/or link an address book or contact list to facilitate connections, follows, messaging, and/or other types of interactions with the entity's external contacts.

Those skilled in the art will appreciate that online professional network 618 may include other components and/or modules. For example, the online professional network 618 may include a homepage, landing page, and/or content feed that provides the latest postings, articles, and/or updates from the entities' connections and/or groups to the entities. Similarly, the online professional network 618 may include features or mechanisms for recommending connections, job postings, articles, and/or groups to the entities. Additionally, there are other requests that are not directly mapped to a user-facing component or activity such as profile views, searches, and likes, that are encoded in the activity sequence data. For example, these requests might relate to downstream Application Program Interface (API) calls on the server side. These requests can provide some of the rich signal that the model can exploit better than could be exploited with traditional models using hand-crafted features.

In one or more embodiments, data (e.g., data A 622, data X 624) related to the entities' operations on the online professional network 618 is aggregated into a data repository 634 for subsequent retrieval and use. For example, each login, logout, profile search, profile update, profile view, connection, follow, post, comment, like, share, click, message, interaction with a group, and/or other action performed by an entity in the online professional network may be logged and stored in a database, data warehouse, cloud storage, and/or other data-storage mechanism providing data repository 634.

In turn, the data may be analyzed by an anti-abuse infrastructure 602 in a real-time, nearline, and/or offline basis to detect and respond to attacks such as security breaches, fake user accounts, account takeovers, spamming, phishing, scraping, and/or other types of malicious or undesired user activity with the online professional network 618.

Anti-abuse infrastructure 602 may include a path sequence encoder 626. The path sequence encoder 626 translates each specific request path from the data repository 634 into a standardized token that indicates the type of request and encodes the sequence of operations as integers based upon frequency. More particularly, the standardized request paths are mapped to integers based on the ranking of the frequency of that request path across all users (i.e., across all sequences, not just this sequence) during a particular time frame of interest. Thus, the path sequence enters the path sequence encoder 626 and comes out as a sequence of tokens and integers, with each token representing the type of the operation and each integer indicating how frequently that request path was performed across all users. In an example embodiment, this may be stored as a sequence in the format: <token1>, <integer1>, <token2>, <integer2>, . . . .

Thus, the ranking of the frequency that each standardized request path was requested across all users during the particular time frame of interest is used as the integer for each corresponding standardized request path. The most popular standardized request path is assigned an integer of "0," the second most popular is assigned an integer of "1," and so on. The frequencies are calculated when the path sequence encoder 626 is mapping the request paths into tokens. Thus, for example, if the particular time frame of interest is the previous 6 days, then when the path sequence encoder 626 is mapping the request paths into tokens, it calculates the number of times each request path was requested across all users during the last 4 days, which then represent the frequencies, and then ranks each of those request paths based on their corresponding number of times requested over those 4 days.

By encoding the standardized request paths based on frequency, this makes it easier for the system to determine which standardized request paths to include in the corresponding activity transition matrix. For example, if X is set to 500, meaning that each activity transition matrix only tracks transitions for the top 500 standardized request paths, then each activity transition matrix can be created with normalized paths 0-499 on each of their axes, without needing to independently investigate the frequencies of occurrences of the standardized request paths when setting up the matrices.

Activity transition matrix creator 627 creates the corresponding activity transition matrices from the sequences passed by the path sequence encoder and passes the activity transition matrix as input to the deep learning machine-learned model 628. In some example embodiments, an optional transformation can be applied to the matrix before feeding it to the deep learning machine-learned model 628.

It should be noted that the deep learning machine-learned model 628 may be operated in either a training mode or an evaluation mode. In training mode, the activity transition matrixes are training data that are fed to the deep learning machine-learned model 628 along with labels indicative of whether those activity sequence matrices represented abusive operations or not. In an example embodiment, these labels are binary in nature (e.g., "1" if the corresponding operations are abusive, "0" if not). In another example embodiment, the labels are non-binary and can represent the extent or degree to which the matrix represents abusive operations or not (allowing for, for example, a matrix to be considered "mostly" abusive, or "partly" abusive, or the like).

In an example embodiment, the labels may themselves be obtained from an isolation-forest machine-learned model 630, which takes the matrices (or the raw data from the data repository 634) as input and outputs a score indicative of a measure of abusiveness of the corresponding operations. This isolation-forest machine-learned model 630 will be described in more detail below.

It is not mandatory that this isolation-forest machine-learned model 630 be used to generate the labels, and embodiments are foreseen where the labels are obtained in a different manner, such as through hand-labeling and/or maintaining a repository of examples of prior abusive behavior or generated by other means.

Figure 7:
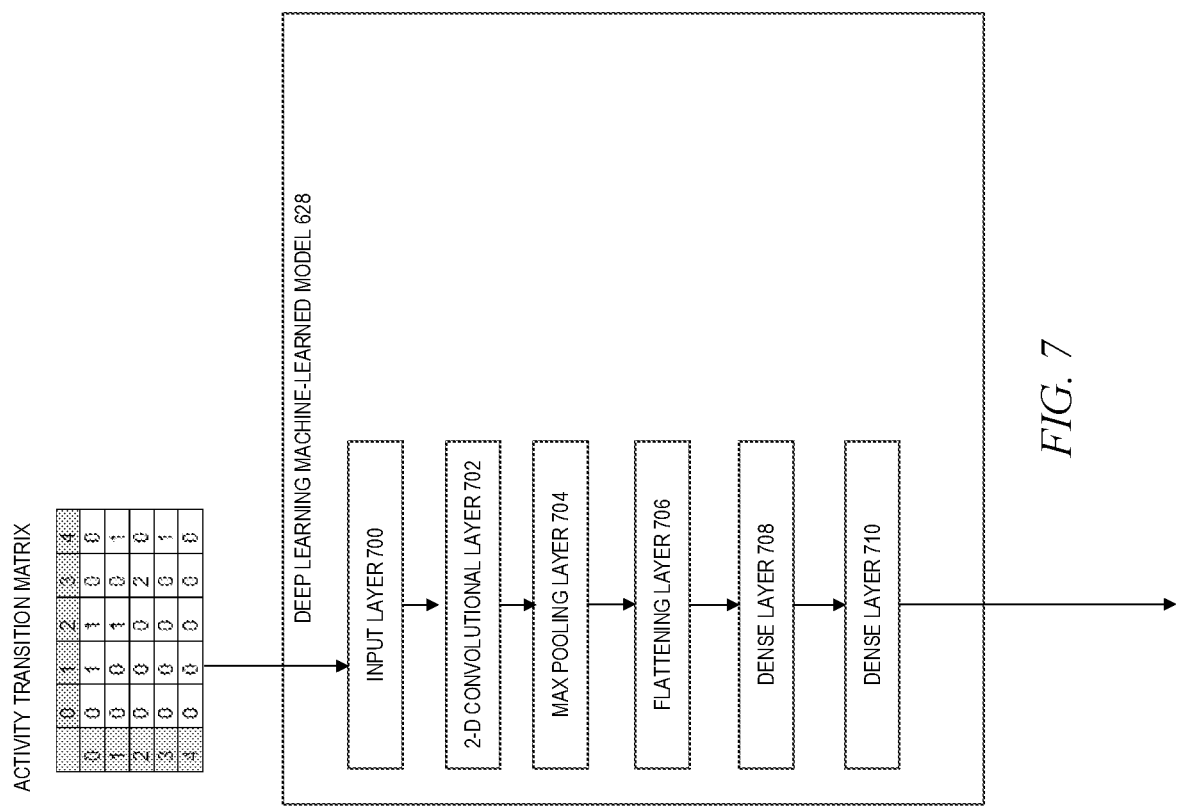
FIG. 7 is a block diagram illustrating a deep learning machine-learned model in more detail, in accordance with an example embodiment.

FIG. 7 is a block diagram illustrating a deep learning machine-learned model 628 in more detail, in accordance with an example embodiment. An activity transition matrix is passed to an input layer 700. The input layer 700 receives the activity transition matrix and passes it to a 2D convolutional layer 702. Then, a max pooling layer 704 reduces the size of the output of the 2D convolutional layer 704, albeit still in two dimensions. A flattening layer 706 then converts this 2D output of the max pooling layer 704 to a single dimension output.

The single dimension output is passed to two or more dense layers 708, 710. The final dense later 710 outputs an indication of whether the user activities in the activity transition matrix appear abusive or not.

Referring back to the isolation-forest machine-learned model 630 of FIG. 6, an isolation forest is a type of unsupervised outlier detection that leverages the fact that outliers are "few" and different," meaning that they are fewer in number and have unusual feature values compared to the inlier class. The isolation forest algorithm uses a randomly-generated binary tree structure to non-parametrically capture the multi-dimensional feature distribution of the training dataset. Each isolation tree is created by first randomly sampling N instance from the training dataset, and then, at each node, randomly choosing a feature to split upon and then randomly choosing a split value from a uniform distribution spanning from the minimum value to the maximum value of the feature chosen to split upon. The last two steps are then repeated recursively until, in principle, all N instances from the sample are "isolated" in leaf nodes of the isolation tree, with one training instance per leaf node. In practice, the tree need not be built so deeply and can apply a height limit.

Figure 8:
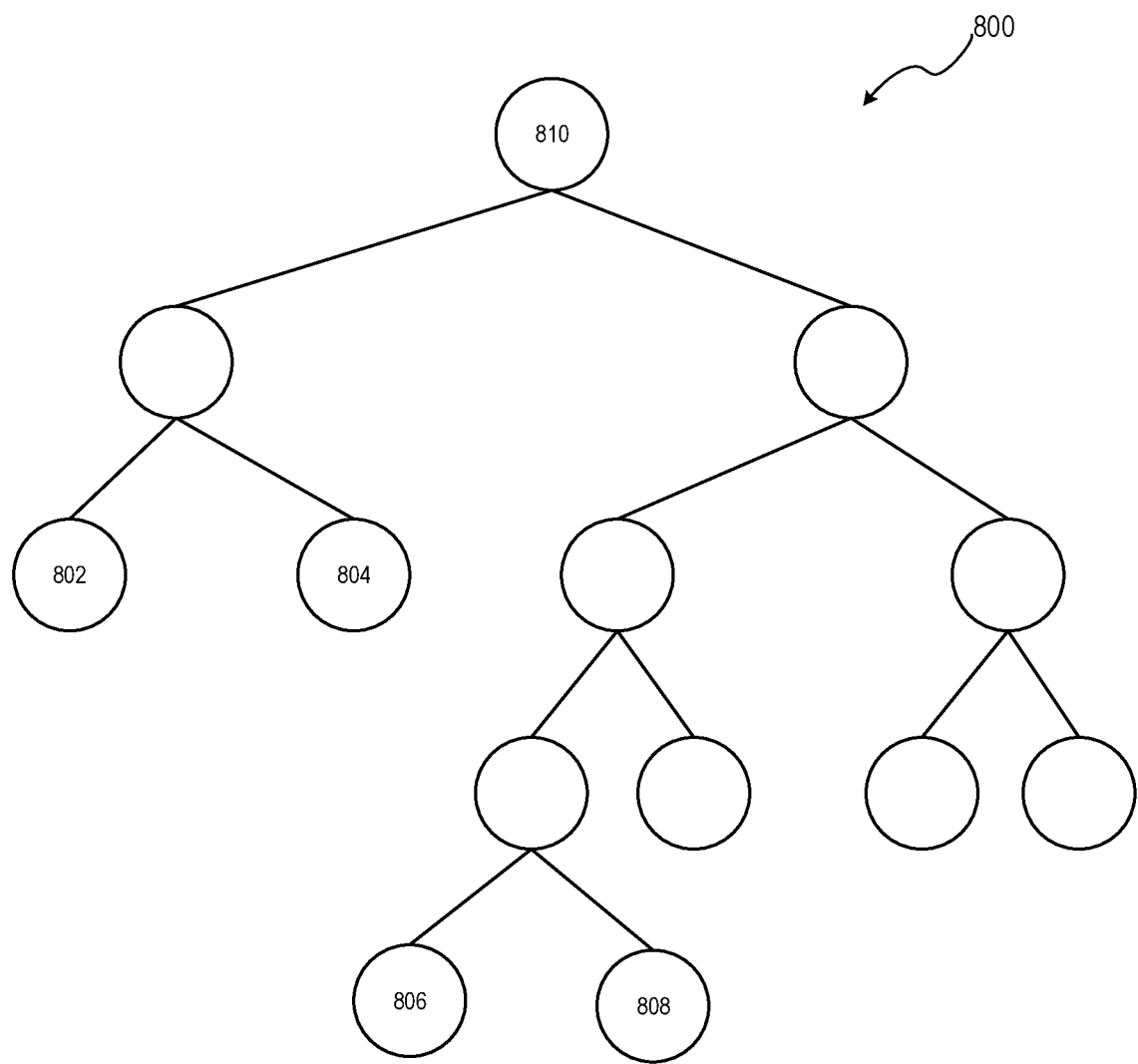
FIG. 8 is a block diagram illustrating an example isolation tree, in accordance with an example embodiment.

FIG. 8 is a block diagram illustrating an example isolation tree 800, in accordance with an example embodiment. Outliers, such as nodes 802 and 804, are easier to isolate, while inliers, such as nodes 806 and 808, are harder to isolate. With respect to standardized request paths, nodes 802 and 804 may represent request types that are atypical for the sequence, while nodes 806 and 808 may represent request types that are typical for the sequence. More particularly, on average, outliers require fewer random splits to achieve isolation. The result is a shorter expected path length from a root node 810 to an outlier node, such as nodes 802 and 804. An outlier score for a particular instance is a function of the path length from the root node 810 to a leaf node and the total number of training instances used to build the tree.

If a height limit is applied when building the tree, some leaf nodes will end up with more training instances than others. This is useful additional information that can be incorporated into the outlier score. The average depth for an unsuccessful search in a binary search tree created with N instances is given by:

$$c(N) = 2H(N-1) - \left(\frac{2(N-1)}{N}\right),$$

where $H(i) \approx \ln(i) + 0.5772156649$. Due to the similar structure of binary search trees and isolation trees, the value $c(N)$ provides the average depth of an isolation tree created using N training instances. For leaf nodes containing $M>1$ training instances, one can add $c(M)$ to the measured path length from the root to the leaf node to account for the number of instances terminating in the leaf node. This sum yields the effective path length for a particular instance, $h(z)$.

An ensemble of isolation trees, called an isolation forest, can then be trained and their outputs can be averaged across to reduce the variance of the isolation-forest machine-learned model 630. Once an isolation-forest machine-learned model 630 is trained, the outlier score for an instance $x_i$ is given by:

$$s(x_i, N) = 2^{\frac{-E(h(x_i))}{c(N)}},$$

wherein $E(h(x_i))$ is the effective path length for that instance, $h(x_i)$, averaged across all trees in the ensemble, and $C(N)$ is the expected depth of an isolation tree given N training instances discussed previously. This uncalibrated score $s(x_i, N)$ ranges from 0 to 1, with higher scores being more outlier-like.

For some types of abuse, such as spam, it is possible to have a scalable review process where humans label training examples as spam or not spam. There are other types of abuse, however, such as scraping, where this kind of scalable human labeling is much more difficult or impossible. Often, the labels that are able to be obtained for training and evaluation are fuzzy, and the precision may be less than ideal, as well as there being poor recall for some types of abusive behavior. Using an unsupervised machine-learned model such as an isolation forest is helpful for problems with few or no labels, as it helps to circumnavigate these label-based challenges.

Figure 9:
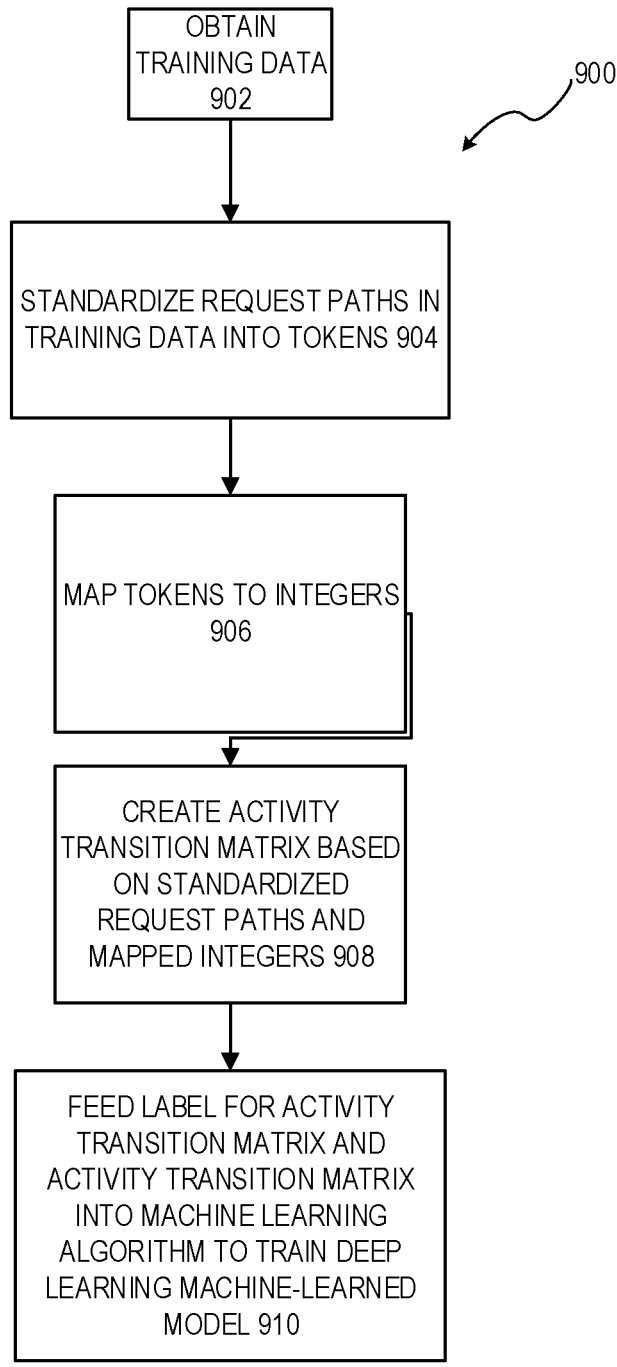
FIG. 9 is a flow diagram illustrating a method, in accordance with an example embodiment.

FIG. 9 is a flow diagram illustrating a method 900, in accordance with an example embodiment. At operation 902, training data is obtained. This training data including sequences of operations performed by accounts of an online network, each sequence indicating a request path for one or more of the operations and an order for the operations. At operation 904, the request paths in the training data are standardized into tokens reflective of operation types of corresponding request paths. At operation 906, the tokens are mapped to integers reflecting a frequency of occurrences of the request paths in sequences of operations performed by a plurality of accounts of the online network. At operation 908, an activity transition matrix is created for the first account, based on the standardized request paths and the mapped integers, the activity transition matrix having source request paths on a first axis and destination request paths on a second axis, with values in cells of the activity transition matrix indicative of a frequency of occurrence of a transition by the first account between a corresponding source request path and corresponding destination path during a predetermined time period. At operation 910, a label for the activity transition matrix and the activity transition matrix are fed into a machine learning algorithm to train a deep learning machine-learned model to calculate a score indicative of a likelihood that a subsequent activity transition matrix for operations performed by a second account of the online network fed as input to the deep learning machine learned model constitutes abusive operations.

Figure 10:
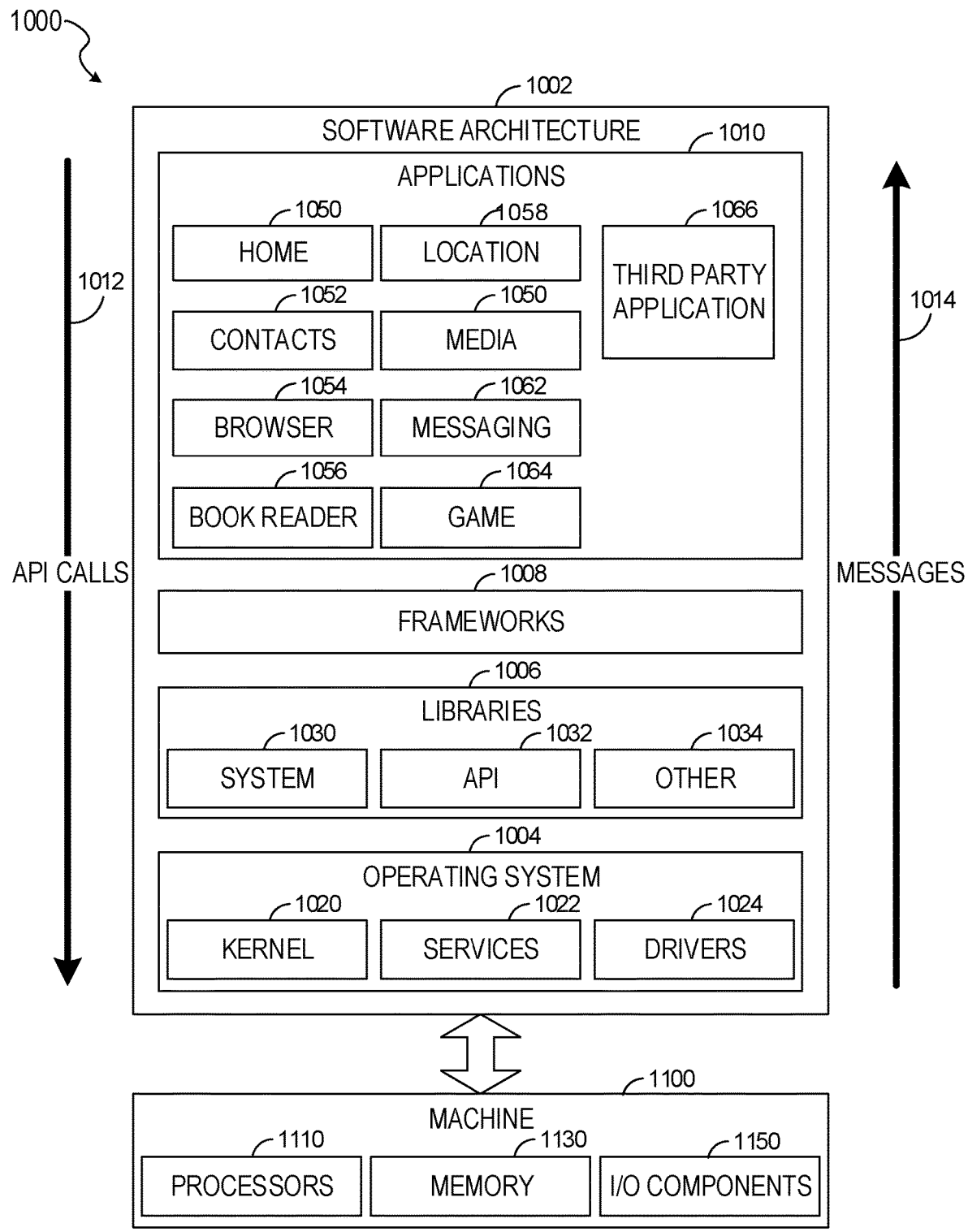
FIG. 10 is a block diagram illustrating a software architecture, in accordance with an example embodiment.

FIG. 10 is a block diagram 1000 illustrating a software architecture 1002, which can be installed on any one or more of the devices described above. FIG. 10 is merely a non-limiting example of a software architecture, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and input/output (I/O) components 1150. In this example architecture, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and three dimensions (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphical user interface functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications, such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Figure 11:
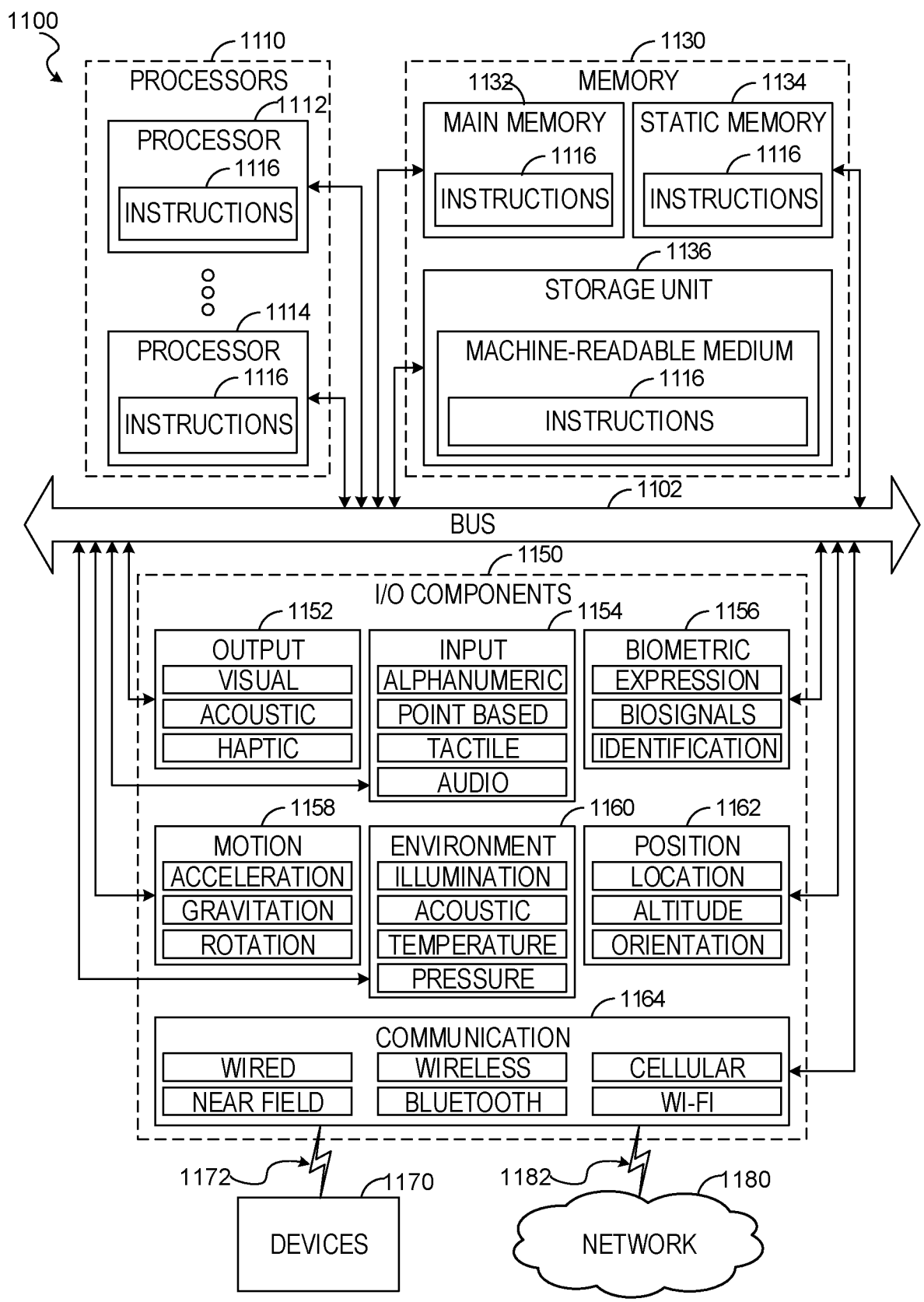
FIG. 11 illustrates a diagrammatic representation of a machine in the form of a computer system within which a set of instructions may be executed for causing the machine to perform any one or more of the methodologies discussed herein, according to an example embodiment.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application 1010, an applet, an app, or other executable code) for causing the machine 1100 to perform any one or more of the methodologies discussed herein may be executed. For example, the instructions 1116 may cause the machine 1100 to execute the method 900 of FIG. 9. Additionally, or alternatively, the instructions 1116 may implement FIGS. 1-9, and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors 1112 (sometimes referred to as "cores") that may execute instructions 1116 contemporaneously. Although FIG. 11 shows multiple processors 1110, the machine 1100 may include a single processor 1112 with a single core, a single processor 1112 with multiple cores (e.g., a multi-core processor), multiple processors 1110 with a single core, multiple processors 1110 with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine 1100 will depend on the type of machine 1100. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1130, 1132, 1134, and/or memory of the processor(s) 1110) and/or the storage unit 1136 may store one or more sets of instructions 1116 and data structures (e.g., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1116 and/or data. The terms shall accordingly be taken to include, but not be limited to, solid-state memories, and optical and magnetic media, including memory internal or external to the processors 1110. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1180 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1116 may be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:
1. A system comprising:
a non-transitory computer-readable medium having instructions stored thereon, which, when executed by a processor, cause the system to perform operations comprising:
obtaining a first sequence of operations performed by a first account of an online network, the first sequence of operations including a plurality of request paths and an order for operations in the first sequence of operations;
standardizing the plurality of request paths into tokens reflective of operation types of the plurality of request paths;
mapping the tokens to integers reflecting a ranking of a frequency of occurrences of the plurality of request paths in sequences of operations, including the first sequence of operations, performed by a plurality of accounts of the online network;
creating an activity transition matrix for the first account, based on the standardized plurality of request paths and the mapped integers, the activity transition matrix having source request paths on a first axis and destination request paths on a second axis, with values in cells of the activity transition matrix indicative of a frequency of occurrence of a transition by the first account between a corresponding source request path and corresponding destination path during a predetermined time period; and
feeding a label for the activity transition matrix and the activity transition matrix into a machine learning algorithm to train a deep learning machine-learned model to calculate a score indicative of a likelihood that a subsequent activity transition matrix for operations performed by a second account of the online network fed as input to the deep learning machine learned model constitutes abusive operations.

2. The system of claim 1, wherein the label is obtained from a value output by an isolation-forest machine-learned model in response to the isolation-forest machine-learned model evaluating the first sequence of operations.

3. The system of claim 1, wherein the operation types of corresponding request paths include at least one selected from a group comprising: profile view, type profile search type, login type, logout type, or any combination thereof.

4. The system of claim 1, wherein the abusive operations comprise scraping of data in the online network.

5. The system of claim 4, wherein the data includes a plurality of user profiles.

6. The system of claim 1, wherein the deep learning machine-learned model is a deep convolutional neural network having a two-dimensional convolutional layer.

7. The system of claim 6, wherein the deep convolutional neural network further includes a plurality of dense layers, a last of the dense layers outputting the score.

8. The system of claim 6, wherein the deep convolutional neural network further includes a max pooling layer.

9. The system of claim 1, wherein the score is a classification of whether the operations performed by the second account are abusive or not.

10. A method comprising:
obtaining a first sequence of operations performed by a first account of an online network, the first sequence of operations including a plurality of request paths and an order for operations in the first sequence of operations;

standardizing the plurality of request paths into tokens reflective of operation types of the plurality of request paths;

mapping the tokens to integers reflecting a ranking of a frequency of occurrences of the plurality of request paths in sequences of operations, including the first sequence of operations, performed by a plurality of accounts of the online network; and creating an activity transition matrix for the first account, based on the standardized plurality of request paths and the mapped integers, the activity transition matrix having source request paths on a first axis and destination request paths on a second axis, with values in cells of the activity transition matrix indicative of a frequency of occurrence of a transition by the first account between a corresponding source request path and corresponding destination path during a predetermined time period; and feeding a label for the activity transition matrix and the activity transition matrix into a machine learning algorithm to train a deep learning machine-learned model to calculate a score indicative of a likelihood that a subsequent activity transition matrix for operations performed by a second account of the online network fed as input to the deep learning machine learned model constitutes abusive operations.

11. The method of claim 10, wherein the label is obtained from a value output by an isolation-forest machine-learned model in response to the isolation-forest machine-learned model evaluating the first sequence of operations.

12. The method of claim 10, wherein the operation types of corresponding request paths include at least one selected from a group comprising: profile view, type profile search type, login type, logout type, or any combination thereof.

13. The method of claim 10, wherein the abusive operations comprise scraping of data in the online network.

14. The method of claim 13, wherein the data includes a plurality of user profiles.

15. The method of claim 10, wherein the deep learning machine-learned model is a deep convolutional neural network having a two-dimensional convolutional layer.

16. The method of claim 15, wherein the deep convolutional neural network further includes a plurality of dense layers, a last of the dense layers outputting the score.

17. The method of claim 15, wherein the deep convolutional neural network further includes a max pooling layer.

18. The method of claim 10, wherein the score is a classification of whether the operations performed by the second account are abusive or not.

19. A system comprising:

means for obtaining a first sequence of operations performed by a first account of an online network, the first sequence of operations including a plurality of request paths and an order for operations in the first sequence of operations;

means for standardizing the plurality of request paths into tokens reflective of operation types of the plurality of request paths;

means for mapping the tokens to integers reflecting a ranking of a frequency of occurrences of the plurality of request paths in sequences of operations, including the first sequence of operations, performed by a plurality of accounts of the online network; and means for creating an activity transition matrix for the first account, based on the standardized plurality of request paths and the mapped integers, the activity transition matrix having source request paths on a first axis and destination request paths on a second axis, with values in cells of the activity transition matrix indicative of a frequency of occurrence of a transition by the first account between a corresponding source request path and corresponding destination path during a predetermined time period; and means for feeding a label for the activity transition matrix and the activity transition matrix into a machine learning algorithm to train a deep learning machine-learned model to calculate a score indicative of a likelihood that a subsequent activity transition matrix for operations performed by a second account of the online network fed as input to the deep learning machine learned model constitutes abusive operations.

20. The system of claim 19, wherein the label is obtained from a value output by an isolation-forest machine-learned model in response to the isolation-forest machine-learned model evaluating the first sequence of operations.

* * * * *